Patented Apr. 21, 1942

2,280,508

UNITED STATES PATENT OFFICE 2,280,508

MANUFACTURE OF SULPHURIC ACID

L'Roche G. Bousquet, Baldwin, and Maxwell J. Brooks, New York, N. Y., assignors to General Chemical Company, New York, N. Y., a corporation of New York No Drawing. Application July 11, 1940, Serial No. 344,910

10 Claims. (Cl. 23—172)

In certain commercial operations, in which sulphuric acid is used to digest a raw starting material, there are formed large quantities of relatively dilute sulphuric acid liquors containing impurities derived from the starting material. Disposal of these liquors to waste entails heavy $H_2SO_4$ loss. Example of an operation of this kind is manufacture of titanium oxide pigments. In this process, ilmenite ores are digested with sulphuric acid and subsequently there is then formed, by steps known in the art, a clarified titanium sulphate solution which is hydrolyzed to precipitate metatitanic acid. The residual mother liquor, resulting from hydrolysis and separation of solid metatitanic acid, is a dilute sulphuric acid solution containing relatively large amounts of iron sulphate and smaller but appreciable quantities of other impurities such as chromium, vanadium and manganese, present as sulphates. Amount of impure mother liquor obtained is large. For example, for every ton of $TiO_2$ pigment produced, there may be formed about 2.4 tons of impure ferrous sulphate monohydrate and about 1.3 tons of sulphuric acid on the basis of 100% $H_2SO_4$, such quantities varying in accordance with the particular hydrolysis process employed and the kind of ilmenite ore used. Economical disposal of these by-products has constituted one of the major problems of the titanium pigment industry.

This invention is directed to recovery of sulphuric acid contained in dilute or waste sulphuric acid liquors such as those produced in the hydrolysis step in the manufacture of titanium oxide pigments. More particularly, this invention deals with processes for recovering such sulphuric acid in highly concentrated condition by a procedure which eliminates metal impurities, of the kind normally present in these liquors, to an extent such that the recovered acid may be reused in the initial digestion step without building up impurities in the circuit to a degree adversely affecting the quality of the pincipal desired product e. g. titanium dioxide, or may be used as sulphuric acid reagent generally, for example in the production of aluminum sulphate by digesting bauxite and sulphuric acid or in manufacture of phosphoric acid by reaction of sulphuric acid and phosphate rock.

While several methods for recovery of sulphuric acid from titanium mother liquors have been suggested, previous methods for concentration of the dilute sulphuric acid, to attempt to make possible reuse of the acid in the digestion operation, have been such that the concentrated acid obtained has been of relatively low $H_2SO_4$ strength, and further, impurity elimination has been poor with the result that most of the impurities are recycled thru the system and gradually build up to a point where the primary sought-for product becomes contaminated to a prohibitive degree. According to one proposal, the waste liquor is neutralized with iron oxide, the mass evaporated and dried in a kiln to ferrous sulphate monohydrate which is then mixed with a given amount of pyrites and roasted in a furnace to produce sulphur dioxide and iron oxide, part of the latter being used to neutralize the free acid of the incoming dilute liquor. The furnace $SO_2$ gases are purified and converted to sulphuric acid in a contact plant. This method requires extensive equipment, is costly, and hence has not been adopted generally.

In another proposal, the initial mother liquor is concentrated by heating to strength of about 30 to 40% $H_2SO_4$. Ferrous sulphate is crystallized and separated out. The partly concentrated liquor is further concentrated to strength of 65–80%, during which operation additional quantities of iron precipitate as ferrous sulphate monohydrate. The sulphuric acid recovered after settling or filtration is, on account of low $H_2SO_4$ concentration, of limited utility and moreover contains such amounts of impurities such as chromium, vanadium and manganese that continuous reuse in the digestion of ilmenite is prohibitive. The iron sulphate resulting from the final concentration step contains large quantities of sulphuric acid and this acid-salt mixture is heated under conditions to oxidize most of the iron sulphate to ferric state and to distill off sulphuric acid. The distillation residue is oxidized in a furnace at relatively high temperatures to produce $SO_3$ and $SO_2$ which are converted to sulphuric acid by the chamber process, the ultimate product of which is not stronger than about 80% $H_2SO_4$. This procedure is cumbersome, expensive to operate, and does not produce any appreciable quantity of sulphuric acid which, from standpoint of $H_2SO_4$ concentration or degree of purity, is suitable for digestion of ilmenite ore.

This invention aims to provide method for recovering sulphuric acid from dilute or waste liquors of the type described by procedure the practice of which results in production of sulphuric acid of concentration of 98% $H_2SO_4$ or above, and elimination of impurities such as above named to an extent that the strong product acid obtained may be reused repeatedly in the ilmenite digestion step without the necessity of having to periodically turn some of the mother liquor to waste in order to bleed out of the system accumulated impurities.

In practice of the invention dilute mother liquor to be treated is first concentrated by any suitable method to an $H_2SO_4$ strength of preferably 60–80%. As known, in an operation of this kind most of the iron, e. g. 95% or more, contained in the original mother liquor is precipitated as ferrous sulphate heptahydrate or monohydrate ferrous sulphate or both depending upon the concentrating method used. Crystallized iron sulphate is separated from the supernatant moderately strong sulphuric acid solution which carries small quantities of iron and other metal impurities such as chromium, vanadium and manganese, as sulphates. The problem heretofore facing the art has been the economic conversion of such an intermediate strength, impurity containing sulphuric acid to an acid of high $H_2SO_4$ concentration and including impurities in quantities small enough to permit wider general use of the recovered acid, and especially reuse of the acid to digest raw ilmenite without building up impurities in the circuit sufficiently to throw the final $TiO_2$ product off color. We have discovered that by treating an intermediate strength acid of the kind described, i. e. an acid from which the bulk of the contained iron has been precipitated and separated out, with contact plant $SO_3$ gas or with oleum in quantity to fortify and increase the sulphuric acid concentration of the solution undergoing treatment to not less than 98% $H_2SO_4$, practically all of the deleterious impurities ordinarily contained in hydrolysis operation mother liquor, e. g. vanadium, chromium, manganese and remaining iron salts, may be precipitated and subsequently separated from the strong acid product.

More particularly, in carrying out the process of the invention we proceed by first concentrating the initial mother liquor to intermediate $H_2SO_4$ strength of for example 60–80%. In practice of the more satisfactory embodiments we find that the condition, with respect to iron sulphate content, of the intermediate strength acid just prior to treatment with $SO_3$ gas or oleum is a factor of importance, and that the physical characteristics of the precipitate formed during the $SO_3$ gas or oleum treatment and comprising the impurities are dependent in a large measure upon the nature of such iron content. It has been observed that in order to produce precipitates in a form readily separable from final strong acid, as by filtration or decantation, the intermediate strength impurity containing sulphuric acid solution at the time of initial treatment with $SO_3$ gas or oleum should not be supersaturated with iron sulphate. Accordingly whatever mechanical procedure, filtration or decantation, may be used to separate out the iron sulphate formed during concentration of the mother liquor up to say 60–80% $H_2SO_4$, we prefer to permit the intermediate strength acid obtained by concentration to stand long enough at any given desired working temperature, for example within the range of 60° C. to 80° C., for a period sufficiently long to allow the mass to reach equilibrium and effect settling out and precipitation of iron sulphate to a degree such that the intermediate strength acid as charged into the $SO_3$ or oleum treatment apparatus is not supersaturated with iron sulphate. As to the actual quantity of iron sulphate present in the intermediate strength acid, we find that the amount soluble in a 50–60% $H_2SO_4$ solution at temperature not above 75° C. does not interfere with precipitation of the other impurities effected by the subsequent fortification.

During increase of the $H_2SO_4$ strength up to 98% or more, preferably not above 104%, by the $SO_3$ gas or oleum fortification operation, considerable quantities of heat are developed. It has been noted that precipitation of impurities to be eliminated takes place to some degree during the increase of $H_2SO_4$ concentration from intermediate up to ultimate strength. On the basis of work done during development of the invention, we believe that maximum precipitation of impurities out of the solution is a function of the final high $H_2SO_4$ concentration and of the temperature of the strong acid product just before filtration or decantation to separate out precipitated impurities. We find that best impurity extraction may be had where, after fortification is completed, the resulting high $H_2SO_4$ liquor is permitted to cool to less than 40° C. and preferably to room temperature. Our work shows where the process of the invention is practiced in accordance with preferred procedure, i. e. by charging into the $SO_3$ or oleum treating apparatus an intermediate strength acid solution which is not supersaturated with iron sulphate and by effecting cooling of the fortified liquor to less than 40° C., observance of the combination of these two factors results in the formation of a precipitate which not only comprises maximum quantities of impurities but is also of such characteristics as to be readily separable from the fortified liquor by simple decantation or filtering. We have noted that in those instances where the intermediate strength acid introduced into the fortification apparatus has been to any extent supersaturated with iron sulphate, while during subsequent fortification the residual iron is sufficiently precipitated, the precipitate is of such physical form that separation not only of the precipitated iron but also of the other precipitated impurities in the fortified liquor presents mechanical difficulties and involves appreciable loss of sulphuric acid in the sludgelike mass resulting from separation.

The sulphuric acid content of the hydrolysis mother liquors treated in accordance with the invention varies widely for example from 10% to 22% $H_2SO_4$, and the ferrous sulphate content as monohydrate may range from 11% to 24%.

Any suitable known method and apparatus may be used for concentrating the weak mother liquor up to intermediate strength and for eliminating the bulk of the contained iron sulphate. One procedure is as follows: At the start of the process, a quantity of mother liquor may be evaporated by heating to $H_2SO_4$ concentration of 30–40%. The liquor is run into an agitating vessel, and cooled if desired to effect precipitation of as much iron sulphate, mostly as monohydrate, as feasible. Crystals are filtered out and washed, wash-water being returned to the agitating vessel. The 30–40% $H_2SO_4$ filtrate is then run into a vacuum concentrator, and concentrated by known principles, e. g. under vacuum of 23–27 inches of mercury, and at temperature of around 95° C. to $H_2SO_4$ strength of from 60 to 80%. Most of the remaining iron is precipitated as monohydrate ferrous sulphate, and appreciable portions of the other metal impurities mentioned are also precipitated as sulphates. While intermediate concentration as low as 50% $H_2SO_4$ is feasible, concentration to at least 60% $H_2SO_4$ is preferred so as to limit the quantity of 98% or stronger sulphuric acid produced in the subsequent fortification operation. On the other hand, intermediate concentration to as much as 85% $H_2SO_4$ may be practicable in some circumstances. Such concentration to more than 80% is undesirable since separation of acid of this strength from the precipitated monohydrate ferrous sulphate ordinarily becomes difficult.

The mass formed in the vacuum concentrator is run into a settling vessel which is preferably insulated to prevent too great heat loss. Operation is such that the vacuum concentrator effluent is held in the settling tank at temperatures of say 60° C. to 80° C. for a time interval, e. g. 4 to 6 hours, sufficient to bring about settling of iron sulphate and to permit the preferably 60–80% $H_2SO_4$ liquor to come to equilibrium at the working temperature employed, and thus form a clear acid which is not supersaturated with iron sulphate. Unsupersaturated acid is drawn off from the settling tank and transferred to the apparatus in which intermediate strength acid is treated with $SO_3$ gas or with oleum. Actual temperature of the intermediate strength acid as supplied to the fortification step is not critical, is more or less a matter of convenience, and as indicated may vary from 60° C. to 80° C. However, for reasons previously stated, it will be understood that the intermediate strength acid, at whatever temperature the same is initially treated with $SO_3$ gas or oleum, should be preferably not supersaturated with iron sulphate.

The iron sulphate sludge collecting in the settling tank following the vacuum concentrator may be returned to the previously mentioned agitating vessel into which may be introduced a sufficient quantity of incoming low acid mother liquor so that the $H_2SO_4$ concentration of the liquid phase in the agitator is 30–40%. In this way, the acid content of the sludge from the settling tank following the vacuum concentrator may be recovered, and at the same time there is produced in the agitating vessel iron sulphate precipitate in crystal form readily separable from the 30–40% $H_2SO_4$ solution.

The method disclosed in Mantius et al. U. S. Patent 2,078,088 of April 20, 1937, may be used to concentrate the mother liquor up to intermediate strength and to eliminate the bulk of the contained iron sulphate. Whatever concentrating method may be used, it will be understood that according to the preferred embodiment of this invention, the intermediate strength acid leaving the final concentrator is handled in such a way that the clear acid, after separation of precipitated iron sulphate and as fed to fortification is not supersaturated with iron sulphate.

Treatment of clarified intermediate strength acid with preferably $SO_3$ gas or with oleum may be carried out in any suitable apparatus. When using $SO_3$, the gas and intermediate strength acid may be contacted on the countercurrent principle. Temperature of the acid on completion of fortification may be for example 160° C. to 210° C., depending upon the particular fortifying procedure used. The strong fortified acid is then cooled, preferably to room temperature, and the precipitated solid impurities filtered out. Degree of impurity removal will be apparent from examples given below.

The process of the invention may be applied to $H_2SO_4$ recovery and impuritiy elimination from weak liquors other than mother liquor resulting from hydrolytic precipitation of metatitanic acid.

For example, spent pickle liquor or any sulphuric acid liquor containing impurities the same as or similar to those contained in titanium hydrolysis mother liquors may be processed in accordance with the procedure described herein.

Examples of practice of the invention are given below.

EXAMPLE I

Mother liquor, resulting from hydrolytic precipitation of metatitanic acid, of analysis A (below) was concentrated in one case up to 60.5% $H_2SO_4$ (analysis B) and in another instance up to 72.3% $H_2SO_4$ (analysis C). Concentration was effected stepwise, as previously described, i. e. by preliminary concentration to about 40% $H_2SO_4$ and separation of precipitated iron sulphate, followed by vacuum concentration up to the desired acid content as indicated in analyses B and C. The analyses show the acid after separation of the crystallized salts.

*Analyses*

| A | | B | | C | |
|---|---|---|---|---|---|
| %$H_2SO_4$ | 10.3 | %$H_2SO_4$ | 60.5 | %$H_2SO_4$ | 72.3 |
| $FeSO_4.1H_2O$ | 12.95 | Fe | 0.157 | Fe | 0.12 |
| $TiOSO_4.2H_2O$ | 0.9 | Mn | 0.016 | Mn | 0.0179 |
| Sp.gr.at 25° C. | 1.26 | Cr | 0.0285 | Cr | 0.0288 |
| | | V | 0.043 | V | 0.039 |

2.25 parts by weight of 65% oleum at about 25° C. was slowly added to 1 part by weight of the 60.5% acid (analysis B) also at 25° C. with mixing. There was a temperature rise up to 200° C. The resulting fortified acid was allowed to cool and settle. The clear product analyzed—

D

| % $H_2SO_4$ | 98 |
|---|---|
| Fe | 0.0022 |
| Mn | 0.0097 |
| Cr | 0.0018 |
| V | Trace (spectrographic analysis) |

In a like manner 1.545 parts by weight of 65% oleum was added to 1 part by weight of 72.3% $H_2SO_4$ (analysis C). The temperature of the mixture rose to 160° C. during the addition. The resulting 98% acid was permitted to cool and settle, and the decanted portion analyzed—

E

| % $H_2SO_4$ | 98 |
|---|---|
| Fe | 0.0017 |
| Mn | 0.005 |
| Cr | 0.0046 |
| V | Trace |

EXAMPLE II

To show that larger amounts of impurities can be removed by the process of the invention, a sample of weak mother liquor was enriched with the three metals Mn, Cr and V as salts, as shown in analyses F and G.

| | F Original mother liquor | G Enriched mother liquor |
|---|---|---|
| %$H_2SO_4$ | 13.2 | 12.8 |
| Fe | 4.58 | 4.44 |
| Mn | 0.064 | 0.456 |
| Cr | Trace | 0.124 |
| V | Trace | 0.026 |
| $TiO_2$ | 3.11 | 3.01 |

Liquor G was concentrated by heating under vacuum until the acid content had reached about 45%. The salts which crystallized out, mostly $FeSO_4 \cdot 1H_2O$, were removed by cooling, settling, and decanting the clear liquor. The clear acid was further concentrated to 82.5% $H_2SO_4$ and the crystallized salts removed as in the previous step. This 82.5% acid was then mixed with 65% oleum in the proportion 1 part by weight to 1 part of 65% oleum. The acid mixture was permitted to cool to about room temperature and settle, and the clear acid separated by decantation. Analysis at the various stages of concentration are given in the following table:

*Table I*

| Acid | G Enriched mother liquor | H 1st conc. and separation | X 2d conc. and separation | J Fortified | Percent removal on fortification |
|---|---|---|---|---|---|
| % $H_2SO_4$ | 12.8 | 45 | 82.5 | 98 | |
| Fe | 4.44 | 3.79 | 0.439 | 0.0075 | |
| Mn | 0.456 | 0.239 | 0.114 | 0.0088 | 99.4 |
| Cr | 0.124 | 0.146 | 0.305 | 0.117 | 69.6 |
| V | 0.026 | 0.083 | 0.096 | Trace | 99.9 |
| Sp. gr. at 25° C | 1.29 | 1.47 | 1.76 | 1.83 | |

Incidentally, analyses H and X show what would occur if mother liquor were concentrated to even 82.5% and reused in digestion of ilmenite. By concentration to this extent, vanadium and chromium impurity concentration actually increases, and in time the harmful impurities would build up and impair the color of the $TiO_2$ pigment made from the solution obtained with such acid.

EXAMPLE III

When a second sample of acid X (Table I) was fortified with a larger amount of 65% oleum to yield an acid containing 104% $H_2SO_4$, the removal of impurities was found to have been somewhat poorer in some cases than when the fortification was carried only to 98% as shown by analysis K.

| | J | K |
|---|---|---|
| % $H_2SO_4$ | 98 | 104 |
| Fe | 0.0075 | 0.0307 |
| Mn | 0.0088 | 0.0109 |
| Cr | 0.117 | 0.131 |
| V | Trace | Trace |

EXAMPLE IV

Fortification of the concentrated mother liquor may be effected by use of $SO_3$ gas with the advantage of reducing both the cost of operation and the amount of fortified acid produced per unit of concentrated mother liquor treated. As in Example II, weak mother liquor was enriched with troublesome impurities as shown in analyses L and M.

| | L Original mother liquor | M Enriched mother liquor |
|---|---|---|
| % $TiO_2$ (total) | 3.11 | 2.90 |
| $H_2SO_4$ | 13.2 | 12.8 |
| Fe | 4.58 | 4.46 |
| Mn | 0.064 | 1.23 |
| Cr | Trace | 0.355 |
| V | Trace | 0.038 |
| Sp. gr. at 25° C | 1.21 | 1.306 |

Enriched mother liquor M was concentrated under vacuum to 54.3% $H_2SO_4$, and cooled. The ferrous sulphate monohydrate was removed by settling, and the decanted acid was fortified by passing into it $SO_3$ from a contact unit until the acid concentration had reached 101% $H_2SO_4$. The fortified acid was cooled and the salts settled out. Analysis at various stages of the process are shown in Table II.

*Table II*

| Analysis | M Enriched | O Conc. | P Conc. | Q Conc. | R Fortification |
|---|---|---|---|---|---|
| % $H_2SO_4$ | 12.8 | 25.2 | 34.7 | 54.3 | 101 |
| Fe | 4.46 | 4.6 | 2.93 | 1.28 | 0.0366 |
| Mn | 1.23 | 1.51 | 0.506 | 0.293 | 0.0099 |
| Cr | 0.355 | 0.51 | 0.706 | 0.806 | 0.0084 |
| V | 0.038 | 0.07 | 0.12 | 0.13 | Blank |
| Sp. gr. at 25° C | 1.306 | 1.498 | 1.523 | 1.645 | 1.872 |

Acid R shows that fortification by gassing with $SO_3$, although diluting the concentrated acid Q to a much lesser extent than occurs when fortification is carried out by adding oleum, produces an acid low in impurities and which is suitable for use in digesting ilmenite in the manufacture of $TiO_2$ pigments.

EXAMPLE V 7.5 gallons of acid B (Example I) and 10.5 gallons of acid C (Example I) were fortified with $SO_3$ from a contact unit in an absorber to a concentration of 99% $H_2SO_4$. The acid obtained was cooled and permitted to settle, and the clear portion decanted. The product acid analyzed S.

S

| | |
|---|---|
| % $H_2SO_4$ | 99 |
| Fe | 0.008 |
| Mn | 0.0009 |
| Cr | 0.007 |
| V | Trace (determined with spectograph) |
| C | 0.11 |

Acid S was used to digest ground ilmenite ore, and pure $TiO_2$ pigment was manufactured from the resulting solution. The quality of the $TiO_2$ pigment produced was equal to that obtained when virgin acid was used by the same process, and both were of good commercial grade.

In all of the above examples, the intermediate strength acid, at the time of initial treatment with oleum or $SO_3$, was not supersaturated with iron.

It is common practice to coagulate suspended residue in titanium sulphate liquors by adding small amounts of glue. The bulk of the glue coats the coagulated residue particles and is removed, but a portion remains with the titanium solution and is carried through to the hydrolysis mother liquor, and hence in the process of the present invention to the final fortified acid. As indicated, the fortified acid shown in analysis S, Example V, contained 0.11% total carbon as organic matter.

Should the organic matter present in the fortified acid be objectionable, it has been found that it can be effectively removed by heating the acid of 98% strength or above to just below its boiling point and maintaining the acid at this temperature until all the organic matter has been oxidized. This method is economical, easily carried out, and has the further advantage that additional impurities are not introduced into the acid.

An example of this phase of the process of the invention follows:

EXAMPLE VI 500 ccs. of 99% fortified $H_2SO_4$ of analysis S, Example V, were placed in an 800 cc. pyrex beaker, covered with a watch glass and heated just below its boiling point (about 280° C.) for ½ hour. The acid did not actually boil, but a slight mist was present above the surface of the acid during heating. The original acid was dark brown in color and almost opaque. As heating took place the acid became gradually lighter in color and less opaque as the organic matter was destroyed. On cooling, the acid was perfectly clear and had a pale yellow color. The heating did not cause the precipitation or crystallization of additional metallic salts, but only oxidation of organic matter.

In instances where it is desired to effect organic impurity removal, such procedure may be practiced immediately after fortification is completed, so that the exothermic heat of fortification need not be lost. Following oxidation of the organic matter, the acid mass is then cooled preferably to about 40° C., and filtered or settled and decanted to separate the previously described precipitated metal impurities.

We claim:

1. In the process of recovering sulphuric acid from residual sulphuric acid liquor resulting from hydrolytic precipitation of metatitanic acid, said liquor containing iron sulphate and other metal impurities, the steps comprising concentrating the liquor, to sulphuric acid strength of not less than 60% $H_2SO_4$, under conditions effecting precipitation from the liquor of the bulk of the contained iron as iron sulphate, separating precipitated iron sulphate from the resulting sulphuric acid solution, treating said solution with material of the group consisting of oleum and $SO_3$ gas to increase sulphuric acid concentration of said solution to not less than 98% $H_2SO_4$, thereby effecting precipitation of metal impurities, and separating precipitated solids from the solution.

2. In the process of recovering sulphuric acid from residual sulphuric acid liquor resulting from hydrolytic precipitation of metatitanic acid, said liquor containing iron sulphate and other metal impurities, the steps comprising concentrating the liquor, to sulphuric acid strength of not less than 60% $H_2SO_4$, under conditions effecting precipitation from the liquor of the bulk of the contained iron as iron sulphate, separating precipitated iron sulphate from the resulting sulphuric acid solution, treating said solution with material of the group consisting of oleum and $SO_3$ gas to increase sulphuric acid concentration of said solution to not less than 98% $H_2SO_4$, cooling the solution to less than 40° C. to promote precipitation of metal impurities, and separating precipitated solids from the solution.

3. In the process of recovering sulphuric acid from residual sulphuric acid liquor resulting from hydrolytic precipitation of metatitanic acid, said liquor containing iron sulphate and other metal impurities, the steps comprising concentrating the liquor, to sulphuric acid strength of not less than 60% $H_2SO_4$, under conditions effecting precipitation from the liquor of the bulk of the contained iron as iron sulphate, separating precipitated iron sulphate from the liquor and forming therefrom a sulphuric acid solution which is not, at the temperature thereof, supersaturated with iron sulphate, treating such resulting solution with material of the group consisting of $SO_3$ gas and oleum to increase sulphuric acid concentration of such solution to not less than 98% $H_2SO_4$, thereby effecting precipitation of metal impurities, and separating precipitated solids from the solution.

4. In the process of recovering sulphuric acid from residual sulphuric acid liquor resulting from hydrolytic precipitation of metatitanic acid, said liquor containing iron sulphate and other metal impurities, the steps comprising concentrating the liquor, to sulphuric acid strength of 60–80% $H_2SO_4$, under conditions effecting precipitation from the liquor of the bulk of the contained iron as iron sulphate, separating precipitated iron sulphate from the liquor and forming therefrom a sulphuric acid solution which is not, at the temperature thereof, supersaturated with iron sulphate, treating such resulting solution with material of the group consisting of $SO_3$ gas and oleum to increase sulphuric acid concentration of such solution to not less than 98% $H_2SO_4$, cooling the solution to less than 40° C. to promote precipitation of metal impurities, and separating precipitated solids from the solution.

5. In the process for removing iron and other metal sulphate impurities from a sulphuric acid solution derived from hydrolytic precipitation of metatitanic acid, said solution being unsupersaturated with iron sulphate at the temperature thereof, the steps comprising treating said solution with material of the group consisting of $SO_3$ gas and oleum to increase sulphuric acid concentration of such solution to not less than 98% $H_2SO_4$ to thereby effect precipitation of the metal impurities, and separating precipitated solids from the solution.

6. In the process of recovering sulphuric acid from residual sulphuric acid liquor resulting from hydrolytic precipitation of metatitanic acid, said liquor containing iron sulphate and other metal impurities, the steps comprising forming from said liquor a solution in which the bulk of the iron of the initial liquor has been precipitated and separated out as iron sulphate, treating said solution with material of the group consisting of oleum and $SO_3$ gas to increase sulphuric acid concentration of said solution to not less than 98% $H_2SO_4$ to thereby effect precipitation of metal impurities, and separating precipitated solids from the solution.

7. In the process of recovering sulphuric acid from sulphuric acid liquor containing iron sulphate and at least one other metal impurity of the group consisting of compounds of manganese, chromium and vanadium, the steps comprising forming from said liquor a solution from which the bulk of the iron of the initial liquor has been precipitated and separated out as iron sulphate, treating the solution with material of the group consisting of oleum and $SO_3$ gas to increase sulphuric acid concentration of said solution to strength of not less than 98% $H_2SO_4$ to thereby effect precipitation of metal impurities, and separating precipitated solids from the solution.

8. In the process of recovering sulphuric acid from sulphuric acid liquor containing iron sulphate and at least one other metal impurity of the group consisting of compounds of manganese, chromium and vanadium, the steps comprising concentrating the liquor to sulphuric acid strength of not less than 60% $H_2SO_4$, under conditions effecting precipitation from the liquor of the bulk of the contained iron as iron sulphate, separating precipitated iron sulphate from the resulting sulphuric acid solution, treating said solution with material of the group consisting of oleum and $SO_3$ gas to increase sulphuric acid concentration of said solution to not less than 98% $H_2SO_4$, thereby effecting precipitation of metal impurities, and separating precipitated solids from the solution.

9. In the process of recovering sulphuric acid from sulphuric acid liquor containing iron sulphate and at least one other metal impurity of the group consisting of compounds of manganese, chromium and vanadium, the steps comprising concentrating the liquor, to sulphuric acid strength of not less than 60% $H_2SO_4$, under conditions effecting precipitation from the liquor of the bulk of the contained iron as iron sulphate, separating precipitated iron sulphate from the liquor and forming therefrom a sulphuric acid solution which is not, at the temperature thereof, supersaturated with iron sulphate, treating such resulting solution with material of the group consisting of $SO_3$ gas and oleum to increase sulphuric acid concentration of such solution to not less than 98% $H_2SO_4$, cooling the solution to less than 40° C. to promote precipitation of metal impurities, and separating precipitated solids from the solution.

10. In the process of recovering sulphuric acid from sulphuric acid liquor containing iron sulphate and at least one other metal impurity of the group consisting of compounds of manganese, chromium and vanadium, the steps comprising concentrating the liquor under conditions effecting precipitation from the liquor of the bulk of the contained iron as iron sulphate, separating precipitated iron sulphate from the liquor and forming therefrom a sulphuric acid solution which is not, at the temperature thereof, supersaturated with iron sulphate, treating said solution with material of the group consisting of oleum and $SO_3$ gas to increase sulphuric acid concentration of said solution to not less than 98% $H_2SO_4$, thereby effecting precipitation of metal impurities, and separating precipitated solids from the solution.

L'ROCHE G. BOUSQUET.
MAXWELL J. BROOKS.